United States Patent [19]

Molt

[11] Patent Number: 4,515,916

[45] Date of Patent: May 7, 1985

[54] STABILIZERS FOR HALOGEN CONTAINING POLYMERS COMPRISING ZINC MERCAPTOESTERS, BASIC INORGANIC ALKALI OR ALKALINE EARTH METAL COMPOUNDS AND, SUBSTITUTED DIHYDROPYRIDINES

[75] Inventor: Kenneth R. Molt, Cincinnati, Ohio

[73] Assignee: Morton Thiokol Inc., Chicago, Ill.

[21] Appl. No.: 577,472

[22] Filed: Feb. 6, 1984

Related U.S. Application Data

[63] Continuation of Ser. No. 379,426, May 18, 1982, , and a continuation-in-part of Ser. No. 269,085, Jun. 2, 1981, abandoned.

[51] Int. Cl.³ .............................................. C08K 5/36
[52] U.S. Cl. ..................................... 524/99; 252/399; 524/423; 524/424; 524/433; 524/301; 524/423; 524/424; 524/433; 524/436
[58] Field of Search ................. 524/99, 301, 423, 424, 524/433, 436; 252/399

[56] References Cited

U.S. PATENT DOCUMENTS

| | | | |
|---|---|---|---|
| 2,723,965 | 11/1955 | Leistner | 524/399 |
| 4,132,691 | 1/1979 | Ejk | 524/181 |
| 4,239,893 | 12/1980 | Pigerol | 260/99 |
| 4,297,268 | 10/1981 | Abeler et al. | 524/181 |

FOREIGN PATENT DOCUMENTS 50-89451  7/1975  Japan .
52-37956  3/1977  Japan .

OTHER PUBLICATIONS

Chemical Abstracts 83 207117c (1975).
Chevassus, F. The Stabilization of Polyvinyl Chloride, 173 & 174, (1963), St. Martins Press, N.Y.
Iida et al., "Investigations on Poly(vinyl Chloride), III & IV, Effects of Metal Chlorides on the Thermal Decomposition of Poly(vinyl Chloride)—J. Polymer Sci., Polymer Chemistry Edition, vol. 15, 2427–2433, 2435–2440 (1977).
Stapfer et al., "Antioxidative Stabilization of Polyvinyl Chloride", American Chem. Society, Div. of Polymer Chemistry, Polymer Preprints, vol. 12, No. 1, 795–803, Mar. 1971.
Lally et al., "Stabilization of Polyvinyl Chloride"—Modern Plastics Encyclopedia, Dec. 1949, 111, 112, 114, 116, 156–162.

*Primary Examiner*—Veronica P. Hoke
*Attorney, Agent, or Firm*—Gerald K. White; Richard J. Sheridan

[57] ABSTRACT

Compositions are provided which are effective for stabilizing halogen containing polymers against the deteriorative effects of heat. These stabilizer compositions comprise (1) at least one zinc mercaptoester, (2) at least one basic inorganic alkali or alkaline earth metal compound, and, optionally, (3) at least one substituted dihydropyridine.

7 Claims, No Drawings

STABILIZERS FOR HALOGEN CONTAINING POLYMERS COMPRISING ZINC MERCAPTOESTERS, BASIC INORGANIC ALKALI OR ALKALINE EARTH METAL COMPOUNDS AND, SUBSTITUTED DIHYDROPYRIDINES

This application is a continuation of application Ser. No. 379,426, filed May 18, 1982, which in turn is a continuation-in-part of application Ser. No. 269,085, filed June 2, 1981, abandoned.

BACKGROUND OF THE INVENTION

Halogen containing polymers, especially chlorine containing polymers, have attained a high degree of commercial significance and use. Polyvinyl chloride (PVC), in particular, is widely used in packaging, siding, pipe and extruded shapes. Such large scale and diverse use of the halogen containing polymers, as exemplified by PVC, is the result, at least in part, of the stabilization of such polymers against degradation caused by light and/or heat. PVC is known to degrade upon prolonged exposure to light and/or heat during processing and use, with attendant darkening or change of color and loss of physical properties (e.g. tensile, flexural and impact strengths). Such degradation detracts from the usefulness of PVC and imposes restrictions on the conditions and apparatus for processing and manufacturing PVC articles. Thus, for example, the service life of a PVC article may be significantly limited, the conditions under which the PVC article is used severely restricted and the manufacturing conditions very narrow.

One particularly troublesome form of degradation of halogen containing polymers occurs when they are processed into articles by methods employing heat to melt or soften the polymer. Color changes can occur in the polymer during the first few minutes (e.g. about 1 to 10 minutes) of processing at high processing temperatures (e.g. about 175° C. to 200° C.). This color change during the first several minutes of exposure to high processing temperatures is commonly referred to as early color or early discoloration. Avoidance of such early color or early discoloration is notably important in a number of applications (e.g. plastic pipe) and is particularly important where white or light colored products are to be made. It is, of course, also important to prevent or reduce discoloration and deterioration of the organic polymer during extended exposure to high processing temperatures, as may be encountered in some processes or fabricating methods. This extended exposure to high processing temperatures can lead to a sudden catastrophic degradation of the polymer which transforms the polymer into a pitch-like abrasive material and can, especially in the case of halogen-containing organic polymers, cause the formation of corrosive materials, e.g. HCl, inside the fabricating equipment. This abrasion and corrosion can ruin the inner, highly-polished surfaces of the fabricating equipment and render the equipment essentially useless.

To prevent or reduce the discoloration and deterioration of halogen-containing polymers during processing at elevated temperatures and during exposure of the fabricated product to elevated temperatures under use conditions, the art has added various materials, known as stabilizers, to the polymers. Most notable among these stabilizers have been the organotin stabilizers. These organotin stabilizers have been found to be particularly effective in the prevention of early discoloration of halogen containing polymers. However, while the organotin stabilizers are capable of lessening or preventing early discoloration, they have in recent years become increasingly expensive, with the result that in relatively low cost products such as pipe the cost of such stabilizers may be difficult to bear.

Attempts have been made to replace the organotin stabilizers, either in part or altogether, with lower cost materials. Various combinations of organotin compounds with other organometallic compounds have thus been developed. One such combination, disclosed in Japanese Kokai 77 37,956 by Minagawa et al., contains at least one alkyl tin compound selected from monoalkyl and dialkyl tin compounds, and at least one mercaptide, salt or ester of mercaptocarboxylic acid, or salt or ester of maleic acid with metals selected from Mg, Ca, Sr, Ba, Zn, Sn or Zr. As the alkyl tin compounds there are disclosed such compounds as, for example, dimethyltin oxide, dimethyltin sulfide, dibutyltin bis(isooctylmercaptoacetate) and monobutyltin tris(isooctylmercaptopropionate). The metal mercaptides, salts or esters of mercaptocarboxylic acids include such compounds as, for example, zinc bis(isooctyl thioglycolate). The complete elimination of organotin compounds was attempted in Japanese Kokai 75 89,451 to Shinkawa. Disclosed are stabilizers for halogen-containing resins containing organozinc compounds and organic acid alkali or alkaline earth metal salts. The organozinc compounds have the formula:

where SX is a mercaptan or mercaptate residue, and Y is the same as SX or an organic acid residue. An example of such organozinc compounds is

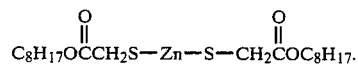

Likewise, U.S. Pat. No. 2,723,965 to Leistner et al. discloses stabilizers for halogen containing polymers which are organometallic compounds having the formula:

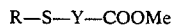

where R is aryl or alkyl, Y is alkylene, and Me is any metal other than an alkali metal, examples of which include the alkaline earth metals, cadmium, lead, zinc and tin.

SUMMARY OF THE INVENTION

The present invention relates to novel compositions comprising (1) at least one zinc mercaptoester, (2) at least one basic inorganic alkali or alkaline earth metal compound, and optionally, (3) at least one substituted dihydropyridine. These compositions are useful as stabilizers for halogen containing polymers.

The present invention also relates to novel polymer compositions which have improved resistance to color change upon exposure to heat during processing comprising a halogen containing polymer, at least one zinc mercaptoester, at least one basic inorganic alkali or alkaline earth metal compound, and, optionally, least one substituted dihydropyridine. These polymeric compositions are useful in the manufacture of rigid articles such as pipe.

DESCRIPTION OF THE PREFERRED EMBODIMENTS

There has now been unexpectedly found in accordance with this invention a stabilizer composition of improved effectiveness in stabilizing halogen containing polymers against the deteriorative effects of heat. Polymer compositions having improved resistance to color changes upon exposure to heat during processing are also provided in the practice of this invention.

In accordance with this invention there is provided (a) stabilizer compositions comprising (1) at least one zinc mercaptoester, (2) at least one basic inorganic alkali or alkaline earth metal compound, and, optionally, (3) at least one substituted dihydropyridine; and polymer compositions comprising (1) a halogen containing polymer, (2) at least one zinc mercaptoester, (3) at least one basic inorganic alkali or alkaline earth metal compound, and, optionally, (4) at least one substituted dihydropyridine.

The halogen containing polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. As vinyl halide homopolymers, vinyl halide copolymers and polymer blends containing vinyl halide homopolymers or vinyl halide copolymers usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethylfumarate (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units.

The zinc mercaptoesters useful in the practice of this invention are organozinc compounds having two mercaptoester groups each bonded to the zinc atom through the sulfur atom, and have the formula:

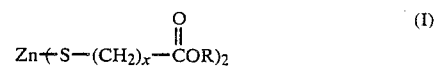

where
x = 1 or 2
R is a $C_1$ to $C_{20}$ straight or branched-chain, saturated or unsaturated alkyl radical.

Examples of zinc mercaptoesters useful in the practice of this invention include, but are not limited to, the compounds illustrated in Table I.

TABLE I

| Zinc Mercaptoester Cmpd. Designation | |
|---|---|
| A | $Zn(SCH_2COC_8H_{17})_2$ |
| B | $Zn(SCH_2CH_2COC_8H_{17})_2$ |
| C | $Zn(SCH_2COC_{18}H_{37})_2$ |
| D | $Zn(SCH_2CH_2COC_{18}H_{35})_2$ |
| E | $Zn(SCH_2COC_2H_5)_2$ |

The term basic inorganic alkali or alkaline earth metal compounds as used herein refers to compounds selected from the group consisting of oxides, hydroxides, sulfides, silicates, phosphates, borates and carbonates of alkali metals or alkaline earth metals. Preferably, the alkali metals are selected from Li, Na and K, and the alkaline earth metals are selected from Mg, Ca, Sr and Ba.

Examples of basic inorganic alkali or alkaline earth metal compounds include, but are not limited to, Ca(OH)$_2$, Mg(OH)$_2$, LiOh, Na$_3$BO$_4$, K$_2$CO$_3$, and sodium silicate.

As used herein, the term substituted dihydropyridine refers to organic compounds containing the heterocyclic ring

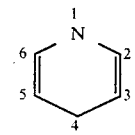

having methyl groups attached to the carbon atoms adjacent to the ring nitrogen atom, i.e. at positions 2 and 6, and having ester groups attached to the ring at positions 3 and 5. More particularly these substituted dihydropyridines are compounds having the formula:

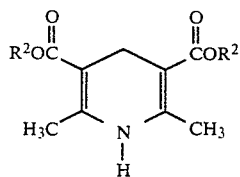

(II)

where $R^2$ is a $C_1$ to $C_{20}$ straight or branched-chain saturated or unsaturated alkyl radical. The substituted dihydropyridines useful in the practice of this invention, and the method of their preparation, are disclosed in U.S. Pat. No. 4,209,439 to Pigerol et al, said patent being hereby incorporated by reference into this specification.

Examples of substituted dihydropyridines useful in this invention include, but are not limited to, the following:

| Substituted Dihydropyridine Number | |
|---|---|
| 1 | $C_2H_5OC(O)-CH=C(CH_3)-NH-C(CH_3)=CH-COC_2H_5(O)$ |
| 2 | $C_{12}H_{25}OC(O)-CH=C(CH_3)-NH-C(CH_3)=CH-COC_{12}H_{25}(O)$ |

The amount of each component in the stabilizer compositions of this invention may vary over a wide range. Generally, however, the stabilizer compositions comprise about 15% to about 85%, preferably about 40% to about 60%, zinc mercaptoester, about 15% to about 85%, preferably about 40% to about 60%, basic inorganic alkali or alkaline earth metal compound, and, when employed, about 1% to about 50%, preferably about 10% to about 30%, substituted dihydropyridine, all percentages being by weight based on the total weight of the stabilizer composition.

Likewise the amount of stabilizer composition employed in the practice of the polymer compositions of this invention may vary over a wide range. It is only necessary that there be present in the polymer composition at least a stabilizingly effective amount of the stabilizer compositions. In general, as little as 0.05 parts by weight of stabilizer composition per hundred parts by weight of halogen containing polymer will be stabilizingly effective. While there is no critical upper limit to the amount of stabilizer composition which can be employed, amounts in excess of about 15 parts by weight of stabilizer composition per hundred parts by weight of halogen containing polymer do not yield an increase in effectiveness commensurate with the additional amount of stabilizer employed. Preferably, the stabilizer compositions of this invention are employed in amounts from about 0.2 to about 7 parts by weight per hundred parts of halogenated polymer.

In the practice of the polymer composition of this invention there may be present, in addition to the halogen containing polymer and stabilizer composition, conventional additives such as fillers, pigments, plasticizers, dyes, lubricants, antioxidants and ultraviolet light stabilizers well known in the plastics art. Among the fillers, such materials as calcined clays, calcium carbonate and talcs may be used. Such materials as titanium dioxide, carbon black and iron oxide may be employed as pigments. Included among the well known plasticizers which are usable are phthalates, sebacates, adipates, phosphates and fatty esters having between 16 and 150 carbon atoms. Well known lubricants which may be used include hydrocarbon waxes, stearyl stearate, cetyl palmitate and other ester waxes. Useful antioxidants include tricresyl phosphite, 2,6-di-t-butyl-4-methyl phenol, 2,6-di-t-butyl-4-decyloxy phenol and 2-t-butyl-4-octadecyloxy phenol.

Methods well-known in the art may be employed to prepare the stabilizer compositions of this invention using conventional equipment. The components may be blended together in any order in any convenient manner which provides uniform dispersion of each component throughout the mixture.

The polymer compositions according to this invention may be prepared by methods well known in the art and by the use of conventional equipment (e.g. a Henschel blender). One such method comprises blending the premixed stabilizer composition to the halogen containing polymer on a two roll mill. In another method the stabilizer composition may be added to the halogen containing polymer with continuous blending in a Henschel blender. The important consideration is that the stabilizer composition and halogen containing polymer be thoroughly blended together.

The stabilized halogen containing polymer compositions of this invention may be used to form articles of manufacturer, e.g. pipe. A variety of conventional molding techniques may be employed to form the stabilized compositions into any desired shape.

The following examples illustrate this invention. Unless otherwise indicated, in the examples and throughout this specification, all amounts, parts and percentages are by weight.

Several mixtures are prepared by dry blending to 110° C. in a Henschel high intensity mixer (Model 2JSS) 100.0 parts of polyvinyl chloride (GEON 103EP-F-76 available commercially from B. F. Goodrich Chemical Company) with 3.0 parts of fine particle size calcium carbonate coated with calcium stearate, 1.0 part titanium dioxide, 1.2 parts of paraffin wax (AD-VAWAX® 165 paraffin wax available commercially from Carstab Corporation), 0.60 part calcium stearate, 0.15 part of an oxidized low molecular weight ethylene homopolymer (AC629A available commercially from Allied Chemical Corporation), and each in turn of the stabilizer compositions listed in Table A in the amounts indicated in Table A, said amounts being parts by weight per hundred parts of polyvinyl chloride. The resulting mixture is masticated on a two roll mill at about 193° C. Samples are taken at one minute intervals beginning after the first introduction of the mix to the mill.

The appearance of each sample taken from the mill is evaluated using the following scale:

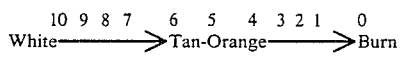

White ⟶ Tan-Orange ⟶ Burn 10 9 8 7 6 5 4 3 2 1 0

The results of these tests are indicated in Table A.

TABLE A

| Ex. No. | Stabilizer Composition | Parts by Weight | Minutes of Milling |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
|  |  |  |  |  |  |  | Color |  |  |  |  |  |
| 1* | Zinc cmpd A from Table I | 0.40 | 10 | 9 | 0 | 0 | 0 | 0 | 0 | 0 | 0 | 0 |
| 2 | Zinc cmpd A from Table I | 0.30 | 10 | 10 | 9 | 8 | 6 | 5 | 5 | 4 | 4 | 4 |
|  | Ca(OH)$_2$ | 0.30 |  |  |  |  |  |  |  |  |  |  |
| 3 | Zinc cmpd A from Table I | 0.30 | 10 | 10 | 10 | 10 | 9 | 9 | 9 | 8 | 8 | 8 |
|  | Subst. dihydropyridine no. 1 | 0.10 |  |  |  |  |  |  |  |  |  |  |
|  | Ca(OH)$_2$ | 0.30 |  |  |  |  |  |  |  |  |  |  |
| 4 | Zinc cmpd A from Table I | 0.20 | 10 | 10 | 9 | 8 | 8 | 7 | 7 | 6 | 5 | 4 |
|  | Subst. dihydropyridine No. 1 | 0.20 |  |  |  |  |  |  |  |  |  |  |
|  | Ca(OH)$_2$ | 0.20 |  |  |  |  |  |  |  |  |  |  |
| 5 | Zinc cmpd A from Table I | 0.10 | 10 | 9 | 8 | 7 | 6 | 5 | 5 | 4 | 4 | 3 |
|  | Subst. dihydropyridine no. 1 | 0.40 |  |  |  |  |  |  |  |  |  |  |
|  | Ca(OH)$_2$ | 0.10 |  |  |  |  |  |  |  |  |  |  |
| 6 | Zinc cmpd B from Table I | 0.30 | 10 | 10 | 9 | 9 | 8 | 7 | 6 | 5 | 5 | 5 |
|  | Subst. dihydropyridine no. 2 | 0.10 |  |  |  |  |  |  |  |  |  |  |
|  | Na$_2$CO$_3$ | 0.30 |  |  |  |  |  |  |  |  |  |  |
| 7 | Zinc cmpd C from Table I | 0.30 | 10 | 10 | 10 | 9 | 9 | 8 | 8 | 7 | 6 | 5 |
|  | Subst. dihydropyridine no. 1 | 0.10 |  |  |  |  |  |  |  |  |  |  |
|  | Mg(OH)$_2$ | 0.30 |  |  |  |  |  |  |  |  |  |  |
| 8 | Zinc cmpd A from Table I | 0.30 | 10 | 10 | 10 | 9 | 8 | 7 | 6 | 5 | 4 | 3 |
|  | Subst. dihydropyridine no. 1 | 0.10 |  |  |  |  |  |  |  |  |  |  |
|  | Na$_3$PO$_4$ | 0.50 |  |  |  |  |  |  |  |  |  |  |
| 9 | Zinc cmpd A from Table I | 0.30 | 10 | 10 | 10 | 9 | 9 | 8 | 7 | 6 | 5 | 5 |
|  | Subst. dihydropyridine no. 1 | 0.10 |  |  |  |  |  |  |  |  |  |  |
|  | Sr(OH)$_2$.8H$_2$O | 0.90 |  |  |  |  |  |  |  |  |  |  |

*For comparison purposes only.

What I claim and desire to protect by Letters Patent is:

1. A composition for stabilizing halogen containing polymers against the deteriorate effects of heat comprising:
   A. at least one zinc mercaptoester having the formula:

$$Zn(S-(CH_2)_x-COR)_2 \quad (I)$$

where
   x = 1 or 2; and
   R is C$_1$ to C$_{20}$ straight or branched-chain saturated or unsaturated alkyl radical;
   B. at least one basic inorganic alkali or alkaline earth metal compound; and
   C. at least one substituted dihydropyridine having the formula:

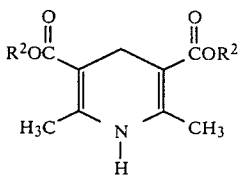

where R$^2$ is a C$_1$ to C$_{20}$ straight or branched-chain saturated or unsaturated alkyl radical wherein the composition comprises about 15% to about 85% zinc mercaptoester, about 15% to about 85% basic inorganic alkali or alkaline earth metal compound, and about 1% to about 50% substituted dihydropyridine, all percentages being by weight based on the total weight the composition.

2. The composition of claim 1 wherein the basic inorganic alkali or alkaline earth metal compound is selected from the group consisting of oxides, hydroxides, sulfides, silicates, phosphates, borates and carbonates of alkali or alkaline earth metals.

3. The composition of claim 1 wherein the basic inorganic alkali or alkaline earth metal compound is Mg(OH)$_2$.

4. The composition of claim 1 wherein the basic inorganic alkali or alkaline earth metal compound is Ca(OH)$_2$.

5. The composition of claim 1 wherein the zinc mercaptoester is zinc bis(isooctylthioglycolate), the basic inorganic alkali or alkaline earth metal compound is Ca(OH)$_2$, and the substituted dihydropyridine has the formula:

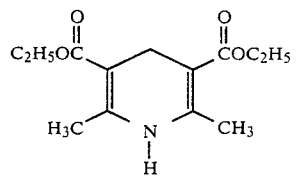

6. A polymer composition stabilized against the deteriorative effects of heat comprising a halogen containing polymer and a stabilizingly effective amount of the composition according to claim 1.

7. A pipe comprising a halogen containing polymer and a stabilizingly effective amount of the composition according to claim 1.

* * * * *